(12) United States Patent
Tirosh

(10) Patent No.: US 9,417,506 B1
(45) Date of Patent: Aug. 16, 2016

(54) UNIVERSAL ADAPTER FOR LIGHT-MODIFYING DEVICES

(71) Applicant: Orili Ventures LTD, Givat Brener (IL)

(72) Inventor: Udi Josef Tirosh, Givat Brener (IL)

(73) Assignee: Orili Ventures Ltd., Givat Brener (IL)

( * ) Notice: Subject to any disclaimer, the term of this patent is extended or adjusted under 35 U.S.C. 154(b) by 58 days.

(21) Appl. No.: 14/324,059

(22) Filed: Jul. 3, 2014

(51) Int. Cl.
*G03B 15/06* (2006.01)
*G03B 17/56* (2006.01)
*F21V 17/00* (2006.01)

(52) U.S. Cl.
CPC .............. *G03B 15/06* (2013.01); *F21V 17/00* (2013.01); *F21V 17/002* (2013.01); *G03B 17/565* (2013.01)

(58) Field of Classification Search
CPC ........ G03B 15/06; G03B 17/565; F21V 1/08; F21V 17/00; F21V 17/002; F21V 17/02; F21V 17/06; F21V 17/10; F21V 17/12
See application file for complete search history.

(56) References Cited

U.S. PATENT DOCUMENTS

| | | | | |
|---|---|---|---|---|
| 1,747,506 A | * | 2/1930 | Erskine | F21V 17/00 362/297 |
| 4,446,506 A | * | 5/1984 | Larson | G03B 15/02 362/17 |
| 6,010,234 A | * | 1/2000 | Rahn | G03B 15/06 362/278 |
| 6,203,174 B1 | * | 3/2001 | Plumeyer | F21V 7/05 362/277 |

FOREIGN PATENT DOCUMENTS

WO 2009068524 A1 6/2009

OTHER PUBLICATIONS

Tirosh, "U.S. Appl. No. 14/150,564, Slide Projector Housing with Mount for Detachable Lens and Strobe", Published in: US.

* cited by examiner

*Primary Examiner* — Bao Q Truong
(74) *Attorney, Agent, or Firm* — Loginov & Associates, Inc.; William A. Loginov

(57) ABSTRACT

An adapter that secures a light-modifying device and unites it with the light reflector and strobe light source that is readily adjustable and protected by a shroud. The adapter is comprised of an adapter body that is provided with a central aperture, a hinged connecting arm that is connected to the adapter body and is constructed with a through hole, a covering shroud that is constructed of opaque material and a plurality of arms that project outward from the adapter body. In an embodiment, the adapter is provided with three arms. Each adapter arm is provided with a moveable bolt and retaining nut that resides with a lateral slot therein. The connecting arm supports an engaged light-modifying device. The shroud is supported by a ring that engages the outer surface of each arm.

11 Claims, 5 Drawing Sheets

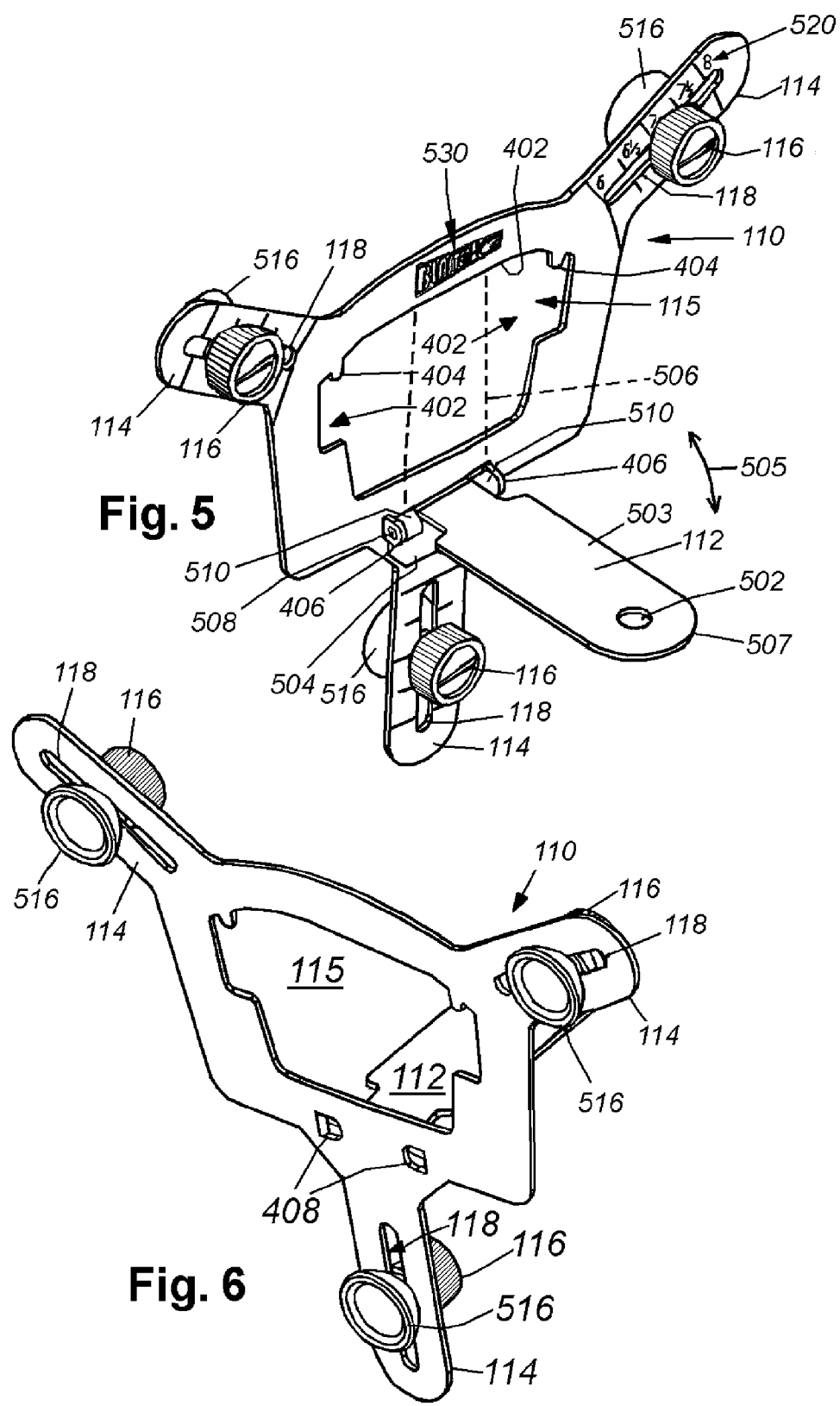

UNIVERSAL ADAPTER FOR LIGHT-MODIFYING DEVICES

FIELD OF THE INVENTION

This invention relates to illumination devices and more particularly to illumination devices for photography that employ a strobe flash.

BACKGROUND OF THE INVENTION

Photographic cameras are sometimes aided with lighting coming from external sources. Those sources can be modified using accessories commonly known as "lighting modifiers". Such lighting modifiers can use many types of lighting sources, but relevant types of light sources are of particular note: "hot shoe" strobes and "studio strobes". Hot shoe strobes are small flashes which employ a standard triggering mechanism known as a hot shoe. They are typically small in size, powered by batteries, and relatively low in power. Studio strobes have bigger flashes, are usually powered off of the electric grid (or dedicated powerful batteries) and emit a very strong light pulse. Both types of strobes can accept lighting modifiers, including "softboxes", "snoots", and ring flashes.

The connection between a lighting modifier and a strobe is determined by the type of the strobe. Hot shoe strobes usually connect to lighting modifiers using hook and loop closure straps, friction fittings inside a small box or being fixed externally to the modifier using a dedicated bracket. Studio strobes attach to lighting modifiers using a device called a "speed-ring"; an apparatus which fit a specific mount of a strobe on one end and a specific type of modifier on the other. The nature of those two very different connections makes it difficult to use a modifier built for a hot shoe strobe with a studio strobe.

Moving a strobe lighting modifier from one position to another during a photographic session can cause the strobe lighting modifier to lose its orientation relative to the strobe light source because of jiggling, rocking or other movements. Using strobes and light reflectors of different sizes and intensities causes time delays due to re-fitting the devices together after readjustment and substitution. The commercially available hot shoe strobe modifiers are provided by various manufacturers with proprietary adapters, and there are no uniform standards that facilitate the use of the modifier of one manufacturer with the lighting source of another. Moreover, lighting modifiers for studios can be more complicated than non-studio lighting modifiers and the additional equipment necessary for both studio and non-studio photography can add to the costs and bulk of photography.

Thus, it is desirable to provide a system and method for allowing a lighting modifier to be held in position relative to the emitting studio strobe and for allowing usage of lighting modifiers built for hot shoe modifiers with studio strobes. It is further desirable to provide a device that includes a shroud that covers the connection between the strobe and the lighting modifier and ensures that all light emitted from the strobe finds its way into the lighting modifiers and does not output undesirable light onto the scene. It is further desirable to provide an adapter that can accommodate and adapt to flash reflectors of various sizes. It is also desirable to provide a system for transforming hot shoe strobe devices into studio strobe devices, or alternatively a new way of securing modifiers to studio strobes.

SUMMARY OF THE INVENTION

The present invention overcomes the disadvantages of the prior art by providing an adapter that secures a strobe modifier and unites it with the light reflector and strobe light source that is readily adjustable, protected by a shroud and universal. The adapter is comprised of an adapter body located at an end of the light modifying device having a central aperture through which light passes into the light modifying device; an optional connecting arm that is connected to the adapter body, defining a through hole; and a plurality of arms that project outward from the adapter body, a covering shroud and a plurality of arms that project outward from the adapter body. In an embodiment, the adapter is provided with three arms, each of which is provided with a lateral slot. The connecting arm is constructed and arranged to fold. Each adapter arm includes a moveable bolt and a retaining nut that resides within the lateral slot. The optional hinged connecting arm is constructed to support the light modifier. The light modifying device comprises a light modifier and the connecting arm is constructed and arranged to interconnect to a lighting modifier at a mounting location thereon. The shroud extends from behind the arms surrounding the bowl reflector and is optionally supported by a ring that engages the outer surface of each arm. The shroud is constructed, at least in part from a light-blocking flexible material. The internal surface of the shroud is covered with light reflecting material.

BRIEF DESCRIPTION OF THE DRAWINGS

The invention description below refers to the accompanying drawings, of which:

FIG. 5 is a perspective view of the front face of the adapter for light-modifying devices according to the illustrative embodiment;

FIG. 6 is a perspective view of the rear face of the adapter for light-modifying devices according to the illustrative embodiment.

DETAILED DESCRIPTION

Figure 1:
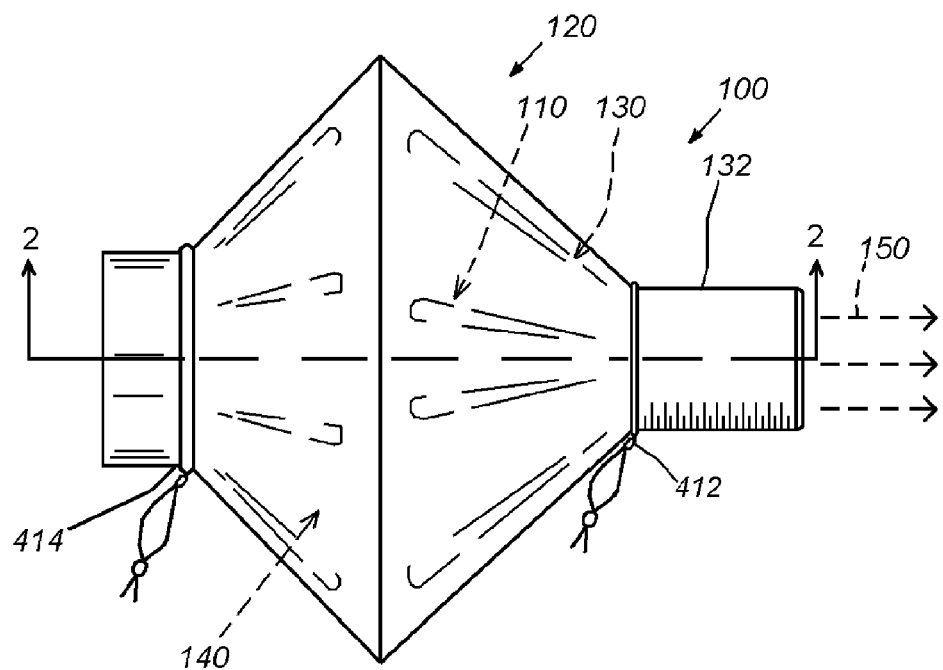
FIG. 1 is a side view of an universal adapter for light-modifying devices according to an illustrative embodiment.
Figure 2:
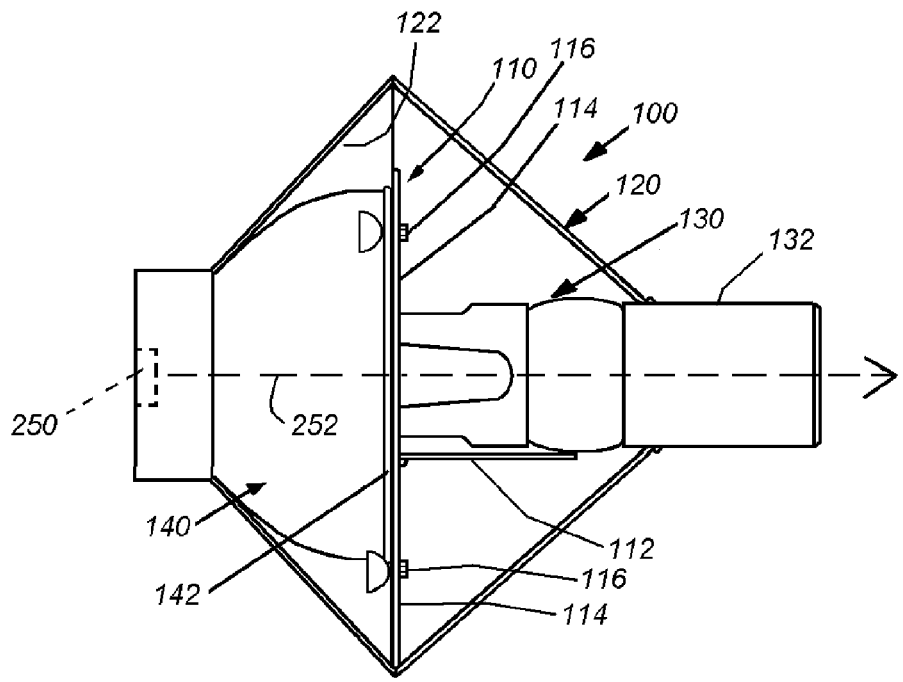
FIG. 2 is a cutaway cross-section view along lines 2-2 of FIG. 1 of the universal adapter for light-modifying devices according to the illustrative embodiment.

An illustrative universal adapter system for light-modifying devices is shown in FIGS. 1 and 2. With reference to FIG. 1, the system 100 is comprised of an adapter 110 (not shown, but described below), and a shrouding cone cover 120. The adapter 110 is a structural interface between an exemplary strobe light modifier light modifier 130 and a flash reflector 140. The exemplary strobe light modifier depicted is a light blaster that receives light from a light source and passes that light through an image slide for projection. In other embodiments, this light modifier can be a snoot, a ring light device, or another modifier. An exemplary light-modifying device in the form and function of a light blaster is shown and described in applicant's co-pending U.S. patent application Ser. No. 14/150,564, entitled SLIDE PROJECTOR HOUSING WITH MOUNT FOR DETACHABLE LENS AND STROBE, by Tirosh, the teachings of which are incorporated herein by reference as useful background information. The adapter 100 removably engages the light modifier 130 and the flash reflector 140. The flash reflector 140 projects light in bursts into the light modifier 130. The light modifier 130 includes a translucent slide of patterns and/or images through which the emitted light from the strobe passes and projects them along a path 150 onto a receiving surface as a photographic device. The receiving surface can be a model, the subject of the image or a background surface. The light modifier 130 is provided with a lens assembly 132 of, for example, conventional design, which can focus or diffuse the emitted image as desired by the photographer. Notably, the adapter system 100 acts as a structural member to unite the strobe, flash reflector, light modifier and lens such that the photographer can create a desired effect that can be sustained through a series of photographs.

The shroud 120 is illustratively constructed of an opaque, or otherwise light-blocking, material that prevents the light emitted from the strobe to leak externally to the light modifier. It is contemplated that the inner surface 122 of the shroud 120 can be surfaced with a reflective material to enhance efficiency of light usage. The external material of the shroud can be made from a material or treatment that is absorbent of light. The shroud material can be a textile product or natural and or synthetic materials (for example, nylon, cotton, blends, etc.), and/or a disposable material (for example, a paper product). The shroud 120 prevents light, dust, dirt, insects and other external materials and influences from interfering with the strobe light emissions, as well as directs all the light into the light modifiers and to ensure that no light is leaked from the strobe and contaminates the scene with uncontrolled and unmodified light. In an embodiment, the adapter can use a device called standard reflector or bowl reflector that is connected to the studio strobe.

The studio flash (not shown in this drawing) is mountable on a support device such as a tripod or a light stand. The flash reflector 140 is attached to a studio strobe by a standard linking device, for example, a speed ring. The attachment of the strobe light modifier to the light reflector by the adapter in turn unites the assembled system with the light emission source that is in turn mounted on a support member. The adapter is universal by accommodating and adjusting to light reflectors of various sizes.

FIG. 2 depicts a partial cross-section with a portion of shroud removed to show the adapter 110, light modifier 130 and the flash reflector 140. The adapter 110 is relatively flat and is constructed with a connecting arm 112 that can be positioned to support the light modifier 130. The illustrative adapter 110 is constructed with three arms 114. The arms 114 are support members that engage the outer rim 142 of the flash reflector and join the flash reflector with the adapter. Because flash reflectors come in a variety of sizes and diameters, the adapter is constructed to accommodate a range of different sizes. This arrangement is facilitated by adjustment bolts 116 that travel in slots along the adapter arms and can be loosened to be moved into proximity with the rim 142 to create an engaging fitment. Light travels from a strobe source 250 along path 252 through the flash reflector 140, the adapter 110, the light modifier 130 and is emitted from the lens 132. The adapter 110, connecting arm 112 and bolts 116 can be treated in whole or in part with opaque materials to create non-reflective surfaces (for example, an anodizing process). The adapter 110 is constructed of a rigid material (for example, aluminum) and can be stamped or cast. In an embodiment, the adapter 110 is constructed of stamped aluminum sheet metal with a thickness of approximately 2 mm.

Figure 3:
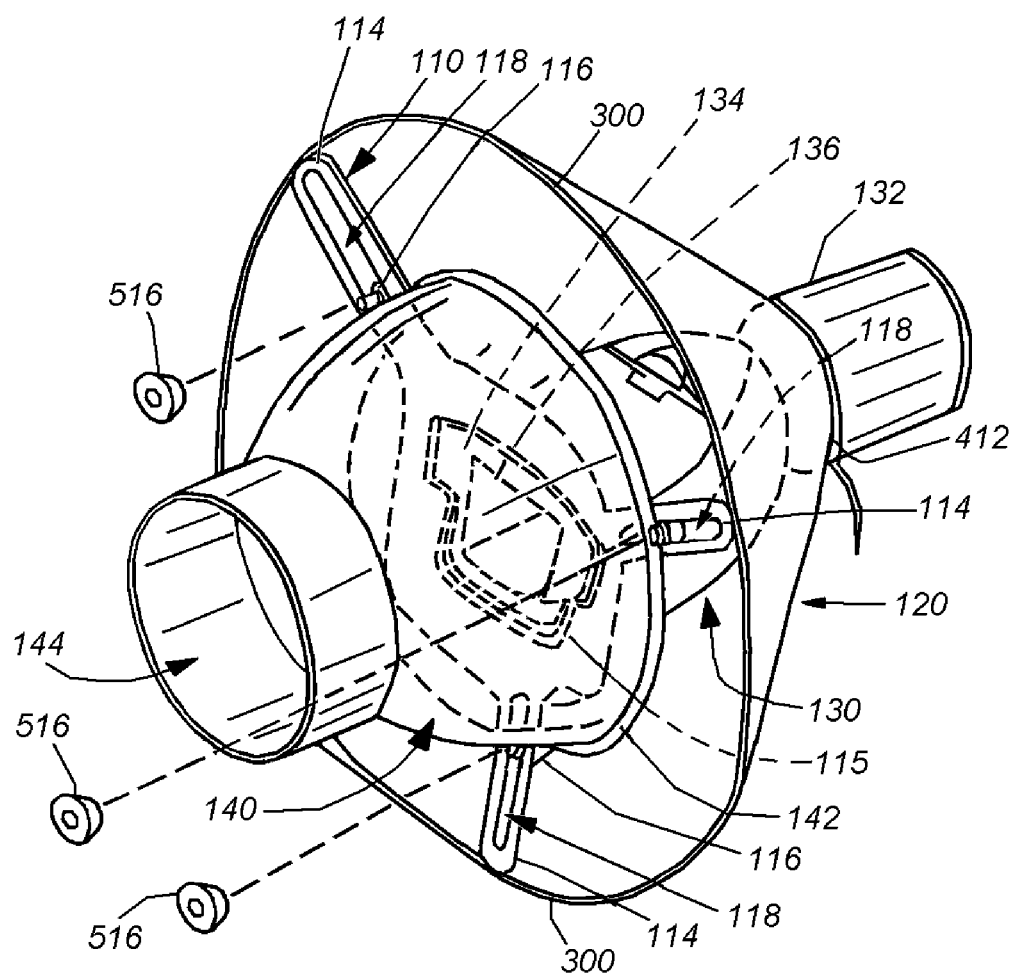
FIG. 3 is a perspective view of the universal adapter for light-modifying devices according to the illustrative embodiment.

FIG. 3 depicts the partially cutaway shroud 120. The three arms 114 of the adapter 110 are shown in greater detail. Each arm is provided with a slot 118 and an adjustment bolt 116 that engages the flash reflector rim 142. A strobe light source (not shown) projects light emissions into aperture 144. The flash reflector 140 directs the strobe light at the adapter 110 and light modifier 130. The adapter 110 is constructed with a central opening 115. The rear surface 134 of the light modifier 130 is engaged and held by the inner perimeter surface of aperture 115. The rear surface 134 of the light modifier is provided with an opening 136 that admits the strobe light into the body of the light modifier 130. The shroud 120 is depicted a having an internal collar ring 300 that presents and maintains a circular orientation for the shroud. The shroud is secured to the device by openings 412, 414 that are opened and closed using cinch pulls. In other embodiments, other closure mechanisms can be used (for example, a hook and loop closure). While the aperture is depicted herein as having a shape that conforms to the shape of the light modifier, it is expressly contemplated that the light modifier can have a rectilinear, circular, square of other regular or irregular shape.

"Rear" and "rearward" are each defined as a direction opposite "front" and "forward", from the emitting aperture to the emitting strobe. "Rear" and "rearward" are in the direction of the light emitting strobe while "front" or "frontward" are in the direction towards the lens and projecting aperture. "Interior" is defined as a region or surface facing or in the open space of the light path 252, while "exterior" is defined as a region or surface facing away from the light path and/or residing on an outside surface of the adapter and shroud, and exposed to the outside environment.

More generally, as used herein the directional terms, such as, but not limited to, "up" and "down", "upward" and "downward", "rearward" and "forward", "top" and "bottom", "inside" and "outer", "front" and "back", "inner" and "outer", "interior" and "exterior", "downward" and "upward", "horizontal" and "vertical" should be taken as relative conventions only, rather than absolute indications of orientation or direction with respect to a direction of the force of gravity.

Figure 4:
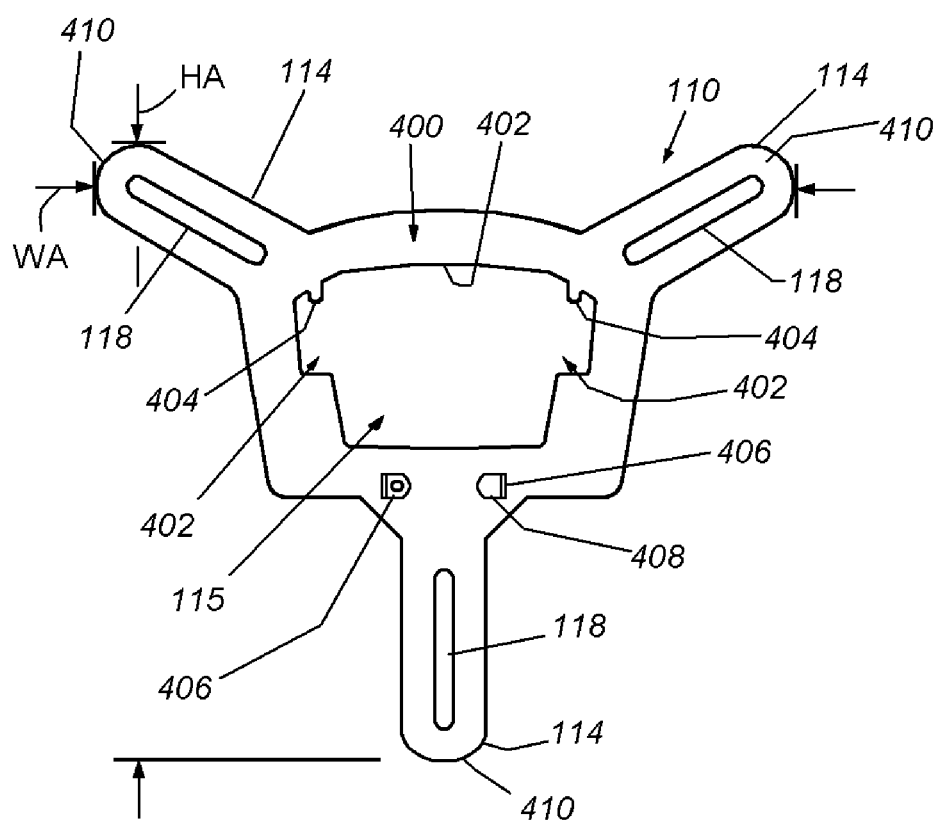
FIG. 4 is a front view of the universal adapter for light-modifying devices according to the illustrative embodiment.

FIG. 4 is a view of the adapter 110 that is shown without the bolts 116. The adapter 110 is comprised of an adapter body 400, a connecting arm (not shown) and a plurality of arms 114 that project outward from the adapter body 400. The illustrative adapter 110 is depicted as being provided with three arms 114. It is contemplated that an adapter can be constructed with more than three arms. Each arm is constructed with a slot 118. The slots provide for lateral movement of the bolts (not shown) to accommodate and adjust to the various diameters of flash reflectors of different sizes. In another embodiment, the moving bolts can be located on a ratcheting mechanism, yet in another implementation the moving bolts can be fitted with an elastic device to direct them towards the center. Furthermore, in another embodiment, the inner part of the adapter apparatus can utilize a locking mechanism using tabs which fit into accommodating grooves on the lighting modifier. The interchangeability of the flash reflectors provides for changing the conditions and strength of the strobes and the emitted strobe light. The central aperture 115 is constructed and arranged to removably engage with the light modifier (not shown). The inner perimeter surface 402 of the aperture is sized to create a tight fit with the outer surface of the blaster. Side bays 404 provide support and a fixed orientation for the blaster when engaged with the adapter. Prongs 404 engage corresponding openings on the blaster for additional security and hold on the blaster. Flanges 406 support and hold the folded arm (not shown). In an embodiment, the flanges 406 can be stamped and folded outwards, leaving a stamping hole 408. The overall height HA of the adapter is approximately 225 mm. The overall width WA is 225 mm. It is expressly contemplated that these dimensions can be greater or lesser depending on the size of the blaster and the range of flash reflectors. Outer arm surfaces 410 make contact with and support the internal collar ring 300 that presents and maintains a circular orientation for the shroud.

FIG. 5 shows the adapter unengaged with a blaster, shroud or flash reflector. The connecting arm 112 is provided with a through-hole 502 for securing the blaster with a bolt. The connecting arm 112 is a rigid member that is "L-shaped", with a long section 503 and a short section 504. The connecting arm travels through a swinging motion 505 of approximately ninety degrees of angular motion from a resting position 506 that partially covers the aperture 115 to a deployed position 507. The arm is movable and is hinged by a pin 508 that is held by collars 510 and engages with flanges 406. The short section 504 rests against the front of the adapter and prevents further movement of the connecting arm 112. Each of a plurality of retaining nuts 516 is placed and arranged within its own slot 118 and engages a frustoconical nut 516 to lock the flash reflector to the adapter. The illustrative nuts 516 are depicted as being constructed with knurling for a gripping texture when tightening and loosening the nut. In other embodiments, the outer surface of the head of each bolt 116 can be constructed with other textures and shapes along the bolt. The nut 516 engages with the rim 142 of the flash reflector and is adjustable. In an embodiment, the adapter 110 is provided with indicia 520 on each arm that can be used as references when positioning the adapter onto a particular flash reflector. It is desirable that the light modifier is positioned relative to the center of the strobe light source so that the projected lighting effect is optimally directed. The indicia on each arm facilitate the centering of the adapter on the flash reflector cone by the photographer. In other embodiments, the nuts can be standard nuts and a plate with a through hole can be placed onto each bolt so that the plate engages the rim of the flash reflector and is secured by a tightening of the nuts on the bolt. In further embodiments, the plate can describe a ratchet that moves along the lateral slot and can be fastened in place by a tightening of the nut.

FIG. 6 shows the rear of the adapter 110 of FIG. 5, and the frustoconical shape and positioning of the nuts 516.

Figure 7:
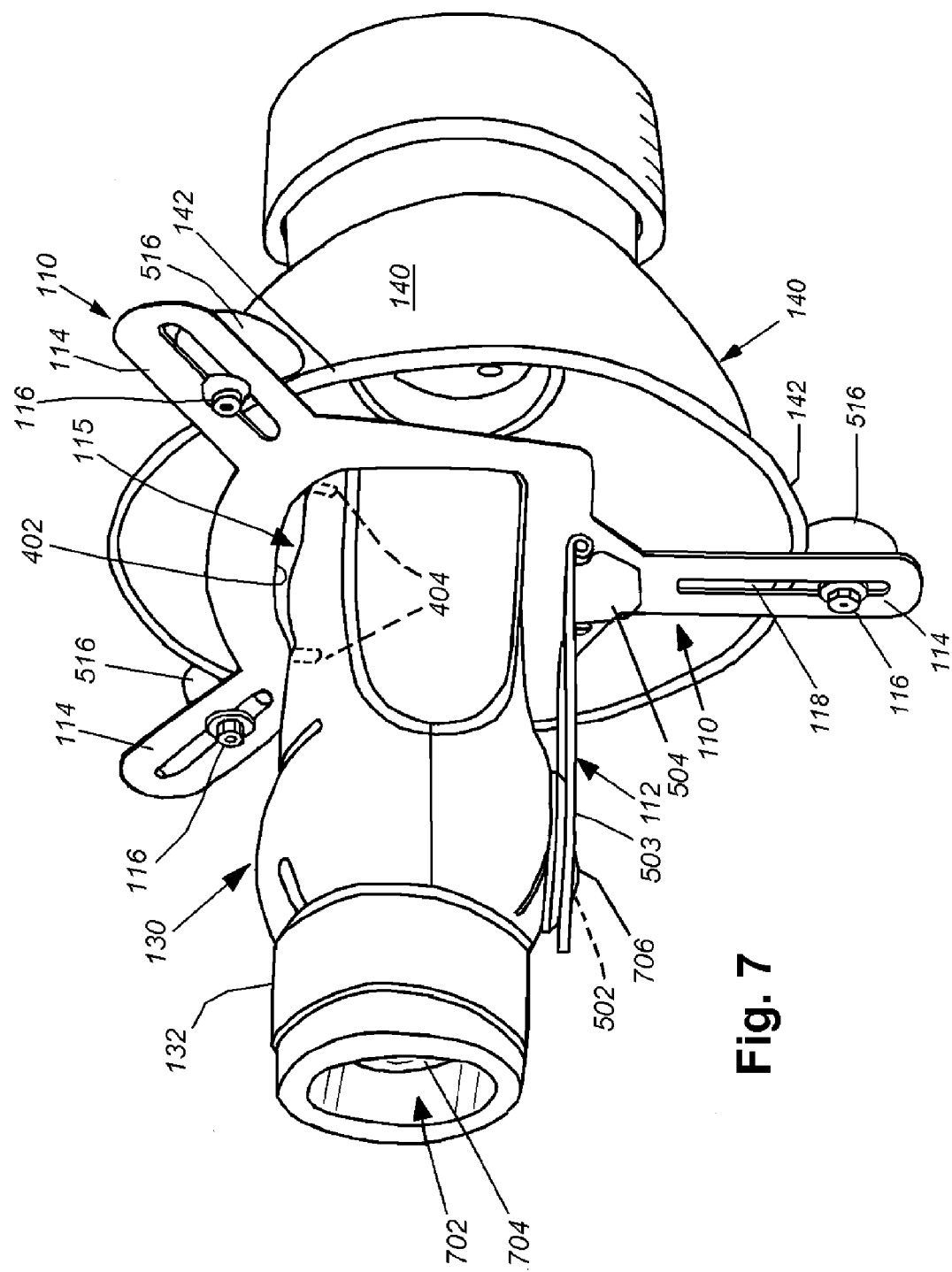
FIG. 7 is a perspective view of the universal adapter for light-modifying devices according to the illustrative embodiment.

FIG. 7 is a perspective view of the illustrative adapter without a shroud. The light modifier 130 is depicted as being provided with a lens 132 that includes a projection opening 702. The lens element 704 resides within the projection opening 702. As noted above, the connecting arm is constructed with a through hole 502. In an embodiment, the light modifier 130 is secured to the connecting arm by a retaining bolt 706 that passes through the through hole 502 into the light modifier 130 at a mounting hole (not shown). The light modifier 130 is thus secured and supported by the adapter at the connecting arm 112 by a retaining bolt 706 and by engaging the inner perimeter surface 402 of the aperture 115 and prongs 404. The adapter 110 is in turn secured to the flash reflector by three arms 114, each of which is provided with inter-engaged bolts 116 and nuts 516 that reside in slots 118 and secure the rim 142 of the flash reflector. The nuts and bolts provide an easy to use adjustment for fitting the adapter onto the flash reflector. The connection of the light modifier to the adapter is comprised of the steps of aligning the blaster with the aperture 115, inserting the prongs 404 and securing the blaster to the connecting arm 112 with a retaining bolt 706.

It should be obvious that the above described adapter provides a device that connects a strobe light source and flash reflector to a blaster with a secure hold. The connection of the light modifier to the adapter and the adapter to the flash reflector is relatively quick and resulting structure is relatively light. The adapter can be conformed to a variety of light modifiers by simple operation of bolts. A covering shroud protects the light emission from external interferences.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the adapter can be constructed of metals, composite materials, rigid polymers or other materials. The shroud can be constructed of a natural or synthetic material. The shroud can also be constructed from a flexible, rigid or semi-rigid material, in whole or in part, and can be light-blocking, partially light-blocking or light-transmissive (in whole or in part—for example, with transmissive and/or light-blocking windows. The shroud can also include a multiplicity of rigid internal support arms to hold a rigid conical shape or rely or the rigidity of the shroud material itself for support. The adapter can be constructed with an anodized surface treatment or another finish—e.g. painted, clear-coated, powder coated, raw metal/plastic, etc. Accordingly, this description is meant to be taken only by way of example, and not to otherwise limit the scope of this invention.

What is claimed is:

1. An universal adapter for a light-modifying device comprising:
   an adapter body adapted to be located at an end of the light modifying device and having a central aperture through which light passes into the light modifying device; and
   a plurality of adapter arms that project outward from the adapter body, the plurality of adapter arms having mounting hardware for mounting to a flash reflector.

2. The universal adapter of claim 1, wherein the adapter is provided with three adapter arms.

3. The universal adapter of claim 1, wherein the adapter is provided with a connecting arm that is connected to the adapter body, defining a through hole.

4. The universal adapter of claim 3 wherein the connecting arm is constructed and arranged to fold.

5. The universal adapter of claim 1, wherein each of the adapter arms includes a lateral slot.

6. The universal adapter of claim 5, wherein each adapter arm includes a moveable bolt that resides within the lateral slot and a retaining nut.

7. The universal adapter of claim 3, wherein the connecting arm is constructed and arranged to interconnect to the light-modifying device at a mounting location thereon.

8. The universal adapter of claim 1, further comprising a shroud that extends from the arms.

9. The universal adapter of claim 8, wherein the shroud is supported by a ring that engages an outer surface of each arm.

10. The universal adapter of claim 8, wherein the shroud is constructed, at least in part from a light-blocking flexible material.

11. The universal adapter of claim 8, wherein the internal surface of the shroud is covered with light reflecting material.

\* \* \* \* \*